Figure 1:
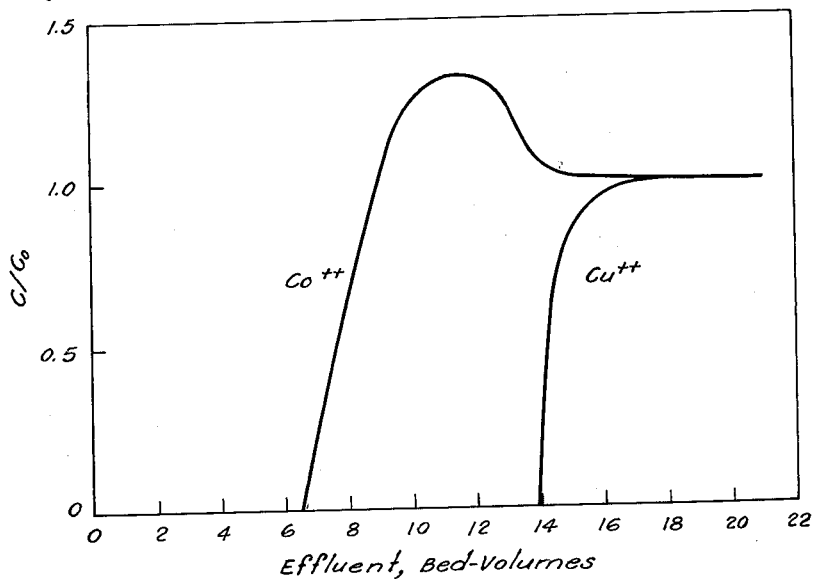

INVENTORS.
Richard A. Mock
Russel C. Calkins
Charles A. Marshall 2,980,607

TREATMENT OF AQUEOUS LIQUID SOLUTIONS OF CHELATE-FORMING METAL IONS WITH CHELATE EXCHANGE RESINS

Richard A. Mock, Russel C. Calkins, and Charles A. Marshall, Midland, Mich., assignors to The Dow Chemical Company, Midland, Mich., a corporation of Delaware Filed May 10, 1957, Ser. No. 658,459

19 Claims. (Cl. 210—31)

This invention relates to the treatment of aqueous liquid media containing metal ions with chelate exchange resins. More particularly, it pertains to chelate exchange resins which contain a high proportion of polymeric vinyl-phenyl aliphatic aminocarboxylic acid units and which are characterized by a large capacity for chelate-binding metal ions, and to a method for employing such chelate exchange resins in separating and isolating metal-containing ions from aqueous liquid media.

Conventional ion exchange resins, such as the water-insoluble, sulfonated crosslinked polystyrene cation exchange resins, are capable of effecting ion exchange reactions with soluble electrolytes in aqueous media contacted therewith. The predominant mechanism is the establishment of equilibrium in a metathetical chemical reaction involving the labile ion of the insoluble resin electrolyte and the corresponding ion of the soluble electrolyte. While practical separations of one metal from another in mixtures have been accomplished with conventional cation exchange resins, such separations involve selective absorptions that depend upon differences between the respective affinities of the several metals in the mixtures for the particular ion exchange resin employed, and these differences are often very small.

It has already been proposed to construct ion exchange materials wherein the ionically active groups would be capable of binding ions by complex formation, e.g. as chelates. However, the kinds of chelate exchange resins that have heretofore been proposed have been unsatisfactory for use in practical extraction and separation processes because the actual capacities of these resins for absorbing cations by chelate complex formation are appreciably lower than the theoretical capacities, and the rates of taking up chelate-forming ions from contacting solutions are impracticably slow.

For example, a resin obtained by condensing m-phenylene diglycine with formaldehyde is described by H. P. Gregor et al. in "Industrial and Engineering Chemistry," vol. 44, No. 12, pages 2834–2839 (December 1952). The capacity of this resin for chelate-forming metal ions is quite low relative to its theoretical capacity, and from 7 to 10 hours are required for the resin to absorb 90 percent of its capacity at equilibrium.

In an article by D. K. Hale in "Research," vol. 9, pages 104–108 (1956), chelate exchange resins are described that contain aminocarboxylic acid groups and that are obtained from chloromethylated highly crosslinked polystyrene resins. The author states (page 108) that "The slow rate of exchange observed with many of these resins is a very serious disadvantage and would severely limit their practical application."

An object of this invention is to provide improved chelate exchange resins and a method for treating liquid media containing metal ions therewith.

A more particular object is to provide improved means for separating and isolating metal-containing ions from aqueous liquid media comprising the same by treatment with chelate exchange resins that contain a high concentration of chelate-forming ligands, that have a high capacity for the chelate-forming metal ions, and that are capable of rapid reaction with the chelate-forming metal ions in the contacting solution.

Other objects and advantages of the invention will be apparent in the following description.

The objects of this invention have been attained by treating aqueous liquid solutions of metal-containing ionized solutes with solid, insoluble chelate exchange resins which contain a high proportion of polymeric vinyl-phenyl aliphatic amino carboxylic acid units, as set forth below.

The figures of the accompanying drawing are graphical representations of data obtained as described hereinafter in the examples.

The chelate exchange resins with which this invention is concerned are ones that have in their polymeric structure at least 80 percent by weight of a chemical unit having the formula

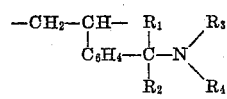

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$,

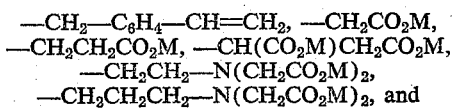

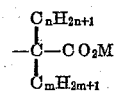

where $n$ is an integer from 1 to 4, $m$ is an integer from 0 to 2, and M is a cation, and wherein at least one of the radicals represented by the symbols $R_1$, $R_3$, and $R_4$ contains a —$CO_2M$ group which together with the nitrogen atom constitutes a metal-chelating group.

Exemplary of such chelate exchange resins are the polymers of N-(ar-vinylbenzyl)iminodiacetic acid, N-(ar-vinylbenzyl)aspartic acid, 2-(vinylphenyl)glycine, and N,N-bis(ar-vinylbenzyl)glycine.

Monomeric vinylphenyl aliphatic aminocarboxylic acids suitable for making the resins required by this invention are described in pending application, Serial No. 615,509, filed October 12, 1956, by Richard A. Mock et al., now U.S. Patent 2,840,603. According to the method described therein, a number of the vinylphenyl aliphatic aminocarboxylic acids are prepared by reacting an ar-vinylbenzyl halide such as the chloride with an α- or β-aminocarboxylic acid having at least one hydrogen atom on the amino nitrogen atom. For example, ar-vinylbenzyl chloride is reacted with disodium iminodiacetate in alkaline aqueous medium, and the reaction mixture is acidified to produce N-(ar-vinylbenzyl)iminodiacetic acid. Other vinyl-phenyl aliphatic aminocarboxylic acids are prepared from ar-vinylbenzylamine. For example, ar-vinylbenzylamine is condensed with diethyl maleate to obtain diethyl N-(ar-vinylbenzyl)-aspartate which is hydrolyzed to provide N-(ar-vinylbenzyl)-aspartic acid. Ar-vinylbenzylamine can also be reacted with sodium chloroacetate in alkaline aqueous media to produce N-(ar-vinylbenzyl)iminodiacetic acid. In similar manner, other primary and secondary amines having a vinylphenyl group can be carboxymethylated by reaction with haloacetic acid salts in aqueous alkaline media to produce vinylphenyl aliphatic aminocarboxylic acids. Some of these aminocarboxylic acids can also be obtained from ar-vinylbenzaldehyde. For example, p-vinylbenzaldehyde is condensed with sodium cyanide and ammonium chloride in ammonium hydroxide aqueous solution, and the resulting product is hydrolyzed with alkali and then acidified to produce 2-(p-vinylphenyl)glycine.

In pending application Serial No. 615,508, filed October 12, 1956, by Leo R. Morris, now Patent No. 2,875,162, polymers of one or more of the afore-mentioned vinylphenyl aliphatic aminocarboxylic acids are described.

In pending application Serial No. 615,467, filed October 12, 1956, by Richard A. Mock et al., now Patent No. 2,910,445, interpolymers of one or more of the aforementioned vinylphenyl aliphatic aminocarboxylic acids and one or more other polymerizable ethylenically unsaturated compounds such as styrene, divinylbenzene, and acrylonitrile are described.

In pending application Serial No. 615,486, filed October 12, 1956, by Leo R. Morris, now Patent No. 2,888,441, there is described a method that comprises reacting an ar-vinylbenzylamino polymer in which the amino group has at least one hydrogen atom with a haloacetic acid in an alkaline aqueous medium to convert the amino groups to N-carboxymethyl groups. For example, polymeric ar-vinylbenzylamine is reacted in aqueous alkali with sodium chloroacetate to produce polymeric N-(ar-vinylbenzyl)iminodiacetic acid.

The vinylphenyl aliphatic aminocarboxylic acid polymers of the kind just described are characterized by containing at least 80 percent by weight of a vinylphenyl aliphatic α- or β-aminocarboxylic acid unit. The vinylphenyl aliphatic aminocarboxylic acid polymers are generally hard, solid, resinous bodies that are insoluble, but swellable, in aqueous media. These resinous polymers contain a high concentration of functional groups of the kind represented by the structure

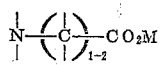

referred to herein as the chelate-forming ligand. Specific illustrations of such groups in these chelate ion exchange resins are the glycine radical

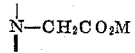

the iminodiacetic acid radical —N(CH₂CO₂M)₂, and the aspartic acid radical

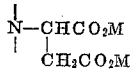

The vinylphenyl aliphatic aminocarboxylic acid chelate exchange resins with which this invention is concerned are further characterized and distinguished by a relatively open gel structure. All of these resins are highly swollen when saturated with water at a high pH, e.g. pH values of 10 or more. One measure of this open gel structure is a high swelling factor, represented by the symbol SF, defined for the present purposes as the arithmetic product of the gel-water content (GWC) in weight percent at the isoelectric pH of the resin and the change in volume of the resin (V'/V) with change of pH from the isoelectric point to a pH of 10, expressed as the ratio of the volume (V') of the resin swollen with water at pH of 10 to the volume (V) of the resin swollen with water at the isoelectric pH of the resin, i.e.

$$SF = (GWC) \times (V'/V)$$

Resins meeting the requirements of the present invention are ones for which the swelling factor is at least 30 and preferably at least 40, there being no upper limit.

The gel-water content is measured on resin particles at the isoelectric pH saturated with water at room temperature. The saturated resin particles are superficially dried (without loss of water from the internal gel structure), and the amount of water retained by the gel, i.e. the gel-water content of the resin, is determined by heating the superficially dry, water-saturated resin particles under vacuum until the resin is anhydrous. The gel-water content is computed as the loss in weight during drying as percent by weight of the resin at the isoelectric pH and saturated with water.

The volume change with pH is measured by saturating a quantity of resin at the isoelectric point by immersing the resin in water at room temperature, observing the volume (V) of the resin, adding strong alkali, e.g. sodium hydroxide or potassium hydroxide, to the aqueous medium to convert the resin to the corresponding salt form in an aqueous medium having a pH of 10, allowing the system to equilibrate, and observing the volume (V') of the resin swollen with water at a pH of 10. The volume change is expressed as the ratio of the volume of the resin swollen with water at pH 10 to the volume of the resin swollen with water at the isoelectric pH of the resin, i.e. V'/V.

The vinylphenyl aliphatic aminocarboxylic acid chelate exchange resins just described and characterized are advantageously useful for isolating and separating metal-containing ions from aqueous liquid media in accordance with the present invention.

The chelate exchange resins are preferably employed in the form of small pieces, e.g. granules or beads having diameters in the order of from 0.005 to 0.02 inch, and in a manner such as ion exchange resins are used.

The method of the invention is practiced by contacting pieces of the chelate exchange resins with aqueous liquid solutions containing at least one solute ionized to provide metal-containing ions capable of interacting with the ligands of the chelate resin and forming a chelate structure therewith. Metals which form chelates with amino acid ligands of the kind described are found in groups I-B, II-A, II-B, III-A, III-B, IV-A, VI-B, VII-B, and VIII of the periodic classification of the elements. Typical such metals are copper, silver, gold, calcium, zinc, iron, cobalt, nickel, platinum, and palladium. The alkali metals, ammonia, and amines form salts with the chelate exchange resin carboxylic acid groups but presumably do not form chelate complexes.

The chelate exchange resins can be employed in acid or salt form of the carboxylic acid groups, and can be employed with aqueous liquid solutions having pH values greater than approximately one. Since the proton is a competitor of the metal ions for the carboxy group, the capacity of the chelate exchange resin for metal ions in acidic solutions diminishes with the pH value of the contacting solution. Preferably, the contacting solution of chelate-forming metal ions should have a pH value of at least 3, e.g. from 3 to 14. Because the reaction of each chelate-forming metal ion with the carboxylic acid ligand liberates at least one proton, the chelation reaction tends to lower the pH value of the contacting solution. For this reason, and to maintain substantially constant pH values during the treating operation, it is sometimes desirable to provide a pH buffer in the solution to be treated.

Although many metal ions are precipitated from aqueous solution as hydrates at pH values above 6, amphoteric metals such as zinc are soluble at higher pH values, and a number of metals are solubilized by ammonium hydroxide by formation of ammine complex ions. In such instances, the present chelate exchange ions can be employed with metal ion-containing solutions at high pH values.

The pieces of chelate exchange resin can be contacted with the liquid solution of ionized solute in any desired manner. In many instances, the pieces of chelate exchange resin can be mixed with, and suspended in, a body of the liquid solution to be treated. This mode of operation is particularly advantageous where the chelate-forming metal ion to be removed from the solution has a high affinity for the ligands of the resin and where the capacity of the resin for such metal exceeds the amount of such metal in the treated body of solution. After treatment, the solid pieces of resin can be separated from the treated solution, e.g. by filtration.

In another mode of operation, the pieces of chelate exchange resin are maintained as a permeable bed, and the solution to be treated is brought into contact therewith. In various embodiments, the solution to be treated and the particles of the bed are caused to move relative to each other, e.g. by moving a stream of the solution through a fixed or moving bed of the resin, or by moving a stream of the resin particles through a fixed or moving body of the liquid solution. These mechanical modes of contacting solutions with solid particles are already well known as applied to conventional ion exchange operations and are readily adapted to similar modes of handling the present chelate exchange resins and liquid solutions to be treated therewith.

Ions of metals that form chelates with the ligands of the chelate exchange resin are readily separated from those ions that do not form such chelates. In such instances, the starting liquid solution of ionized solutes is contacted with the chelate resin whereby the chelate-forming metal ions become bound by the resin in chelate structures whereas the non-chelate forming ions remain freely dissolved in the liquid solution. The resin and the liquid are mechanically separated to complete the separation of the ion species.

Ions of metals that form chelates with the ligands of the chelate exchange resin are also separable from each other on the basis of the relative stabilities of the respective metal chelate complexes. In such instances, when a chelate exchange resin is contacted with a solution containing two or more metal-containing ions capable of forming chelate complexes with the ligands of the chelate exchange resin, the resin will combine with such chelate-forming metal ions until the resin is satiated. Further contact of the metal-containing resin with more solution containing more than one kind of ion capable of chelating with the resin results in the ion species which forms the stronger, more stable chelate entering the chelate structure of the resin and displacing therefrom an ion species whose chelate structure is less stable. The metals bound in such chelate resin structures accordingly become richer than the starting solution in the metal species which form the stronger chelates. In instances where the starting solution in contact with the resin contains an amount of each metal-containing ion species capable of forming chelate complexes with the ligands of the resin in excess of the capacity of the resin for such metal ions, there is established an equilibrium between the kinds and amounts of ions bound on the resin and the kinds and amounts of ions in the ionizing solution in contact therewith.

The relative (but not necessarily the absolute) affinities of chelate-forming metal-containing ions in aqueous solution for the ligands of the chelate-exchange resins, i.e. the relative stabilities of the corresponding chelate complexes, are substantially the same as the relative affinities of these chelate-forming metal-containing ions in aqueous solution for similar ligands of water-soluble chelating agents. Chelate stability constants for a number of metals and water-soluble chelating agents under certain conditions have been reported in the literature, e.g. by A. E. Martell and M. Calvin in "Chemistry of the Metal Chelate Compounds," published (1953) by Prentice-Hall, Inc., New York, page 525 ff.

Because the selectivity of the chelate-forming ligands in the present chelate exchange resins for the chelate-forming metal ions involves the stability of the resulting chelate complex, the affinities of the chelate exchange resins for different metal ions often differ by several orders of magnitude, in contrast to the closely similar affinities often found in ordinary ion exchange resins. These differences in affinities, combined with the relatively large capacity and high reaction rates of the present chelate exchange resins, form the basis for the advantageous separation and isolation of metal ions by the present method.

Furthermore, the present chelate exchange resins provide a choice of ligands, as hereinbefore set forth, e.g. the glycine-type, the iminodiacetic acid-type, or the aspartic acid type, by which optimum separation of a particular ion mixture can be obtained.

The metal-laden chelate exchange resins can be regenerated, and the metals eluted therefrom, by extraction with solutions capable of dissociating the chelate complex, e.g. with aqueous acid. In column operations involving a chelate-resin bed laden with a mixture of metal ions, it is frequently possible to obtain selective elution of the several metal ion species, as shown below in Example 6.

For the purpose of demonstrating the kinds of separations that can be accomplished by the use of the present chelate exchange resins, and for the purpose of illustrating the present method, tests were carried out on several of these chelate exchange resins to obtain the data shown in Table 1. In this table, the kind of chelate exchange resin employed is identified. The preparation of the N-(ar-vinylbenzyl)iminodiacetic acid resin is described in Example 1. The preparation of the N-(ar-vinylbenzyl)aspartic acid resin is described in Example 3. The N-(ar-vinylbenzyl) glycine resin was similarly prepared by copolymerization of N-(ar-vinylbenzyl)glycine and approximately 2 percent by weight of divinylbenzene.

The swelling factors of these resins were determined (by the method hereinbefore described) as follows:

| Resin | Gel-Water Content Wt. Percent | Volume Change, $V''/V$ | Swelling Factor |
|---|---|---|---|
| I. An N-(ar-vinylbenzyl)-iminodiacetic acid resin | 31.9 | 2.07 | 66 |
| II. An N-(ar-vinylbenzyl)-glycine resin | 37.7 | 2.48 | 94 |
| III. An N(ar-vinylbenzyl)-aspartic acid resin | 51.0 | 1.034 | 53 |

In Table 1, the kinds of metals and the molar concentration of each metal, in the starting solution are shown for each test. The solutions were prepared by dissolving the corresponding amounts of the di-valent metal chloride or sulfate salts in water. In all instances, the starting solution was buffered with equimolar acetic acid-sodium acetate mixture. In each test, 150 ml. of solution was admixed with the amount of chelate exchange resin shown (dry basis). The mixtures were allowed to come to equilibrium, after which the resins were separated from the solutions by filtration. The solutions in contact with the resins at equilibrium were analyzed, and the table shows, for each test, the molar concentration of each metal and the molar ratios of the metals in such solutions.

The resins were washed with water to remove solution held mechanically, and the washed resins were eluted with 6 N hydrochloric acid. The eluates were analyzed to determine the amount of each metal in milligram-moles per gram of dry resin and the molar ratio of the metals held on the resin in each test, as shown in the table. The equilibrium quotient is obtained by dividing the molar ratio of metals in the resin at equilibrium by the molar ratio of those metals in the solution.

TABLE 1

*Chelate exchange resins in equilibrium with metal ions in buffered aqueous media*

| Test No. | Chelate Resin Kind (Note) | Grams (dry) | Metals in Starting Solution, Molarity A | B | Metals in Solution at Equilibrium, Molarity A | B | A/B | pH at Equilibrium | Metal in Chelate Resin Mg.-moles per gram (dry) A | B | A+B | A/B | Equilibrium Quotient |
|---|---|---|---|---|---|---|---|---|---|---|---|---|---|
| 1 | I | 0.35 | Ni, 0.095 | Co, 0.0194 | 0.089 | 0.019 | 4.68 | 4.4 | 2.46 | nil | 2.46 | ∞ | ∞ |
| 2 | I | 2.14 | Ni, 0.076 | Zn, 0.062 | 0.051 | 0.056 | 0.091 | 4.3 | 1.763 | 0.409 | 2.172 | 4.31 | 4.75 |
| 3 | I | 0.026 | Cu, 0.0009 | Co, 0.0122 | 0.0006 | 0.012 | 0.05 | 4.6 | 1.38 | 1.63 | 3.01 | 0.85 | 17 |
| 4 | I | 0.44 | Pd, 0.0068 | Cu, 0.0141 | 0.0029 | 0.007 | 0.415 | 4.2 | 0.795 | 1.46 | 2.255 | 0.55 | 1.33 |
| 5 | II | 10.28 | Co, 0.0555 | Zn, 0.0544 | 0.0544 | 0.0532 | 1.022 | 4.3 | 0.0298 | 0.0182 | 0.048 | 1.64 | 1.6 |
| 6 | II | 1.19 | Ni, 0.478 | Co, 0.623 | 0.477 | 0.623 | 0.766 | 3.8 | 0.216 | 0.0281 | 0.2441 | 7.7 | 10.0 |
| 7 | II | 0.62 | Ni, 0.0097 | Zn, 0.0944 | 0.00952 | 0.0938 | 0.102 | 4.3 | 0.038 | 0.136 | 0.174 | 0.28 | 2.75 |
| 8 | II | 0.22 | Cu, 0.00855 | Co, 0.1146 | 0.00734 | 0.1146 | 0.064 | 4.3 | 0.819 | 0.0722 | 0.8912 | 11.3 | 177 |
| 9 | III | 2.15 | Co, 0.615 | Ni, 0.501 | 0.609 | 0.500 | 1.218 | 3.7 | 0.533 | 0.143 | 0.676 | 3.72 | 3.06 |
| 10 | III | 0.34 | Zn, 0.1023 | Ni, 0.0102 | 0.0994 | 0.0099 | 10.0 | 4.2 | 1.312 | 0.127 | 1.439 | 10.3 | 1.03 |

NOTE:
Chelate Exchange Resin I was an N-(ar-vinylbenzyl)iminodiacetic acid resin.
Chelate Exchange Resin II was an N-(ar-vinylbenzyl)glycine resin.
Chelate Exchange Resin III was an N-(ar-vinylbenzyl)aspartic acid resin.

In order to demonstrate the rapid rate with which the present chelate resins take up chelate-forming metal ions from a contacting solution, tests were carried out in which a quantity of dry resin was mixed with a chelate-forming metal-containing aqueous solution, and the pH value of the solution was plotted as a function of time until the resin reached equilibrium with the contacting solution. As the metal ions were taken up by the chelate-exchange resin, hydrogen ions were displaced from the resin into the solution, causing a decrease in the pH of such solution. The solutions were unbuffered aqueous solutions of di-valent metal chlorides as follows:

Solution: Composition
A _____ 0.05 M Cu + 0.4 M Co
B _____ 0.07 M Cu + 1.01 M Ni
C _____ 0.05 M Zn + 0.05 M Ni
D _____ 0.05 M Ni + 0.06 M Co The resins employed were the N-(ar-vinylbenzyl)iminodiacetic acid resin (Resin I) and the N-(ar-vinylbenzyl)aspartic acid resin (Resin III) described in Examples 1 and 3, respectively, and employed above in obtaining the data in Table 1.

The pH data obtained in these tests were then recalculated in terms of the percentage of the total reaction that had taken place at measured intervals of elapsed time. These data are shown in Table 2.

The data shown in Table 1 were obtained from acidic starting solutions. In order to demonstrate further variations of this method, other tests were carried out with mixtures of metals in ammoniacal aqueous solution. The data shown in Table 3 were obtained in manner like that described for the tests in Table 1. Ammoniacal solutions of metal ions (cupric and nickelous) in concentrations shown in Table 3 were prepared, the ammonia being approximately 7 molar in the solutions. In each instance, quantities of resin and of solution were used such that the metal present in least amount was present in amount more than twenty times the total capacity of the chelate resin, i.e. so that the composition of the solution remained substantially unchanged during the reaction with the chelate exchange resin, the resin and solution being allowed to come to equilibrium at room temperature. The resins were separated from the solutions, washed with ammonia water to remove residual metal solution held mechanically, and eluated with 6 M hydrochloric acid to extract the metal held by the chelate exchange resin. Table 3 shows the amount of each metal (in milligram-moles per gram of dry resin) and the ratio of metals on the resin in each test. The equilibrium quotient is obtained by dividing the molar ratio of nickel to copper on the resin at equilibrium by the molar ratio of nickel to copper in the solution in equilibrium therewith.

TABLE 3

| Kind of Chelate Resin | Test No. | Metals in Solution Molar Concentration Nickel | Copper | Ratio Ni/Cu | Metals in Chelate Resin Milligram-moles per gram dry resin Nickel | Copper | Total | Ratio Ni/Cu | Equilibrium Quotient |
|---|---|---|---|---|---|---|---|---|---|
| N-(ar-Vinylbenzyl)-aspartic acid | 11 | 0.851 | 0.124 | 6.86 | 3.0 | 0.19 | 3.19 | 15.8 | 2.3 |
| | 12 | 0.365 | 0.414 | 0.88 | 2.2 | 0.67 | 2.87 | 3.2 | 3.64 |
| | 13 | 0.069 | 0.857 | 0.08 | 1.23 | 1.85 | 3.08 | 0.67 | 8.4 |
| N-(ar-Vinylbenzyl)-iminodiacetic acid | 14 | 0.90 | 0.087 | 10.3 | 2.52 | nil | 2.52 | ∞ | ∞ |
| | 15 | 0.50 | 0.44 | 1.14 | 2.23 | 0.33 | 2.56 | 6.8 | 5.96 |
| | 16 | 0.10 | 0.79 | 0.127 | 1.34 | 0.89 | 2.23 | 1.5 | 18 |

TABLE 2

| Test | A | B | C | D |
|---|---|---|---|---|
| Chelate Resin | I | III | III | III |
| Solution | A | B | C | D |
| Percentage of Chelation Reaction Complete after— | | | | |
| 5 minutes _____ percent | 75 | 67 | 90 | 85 |
| 10 minutes _____ do | 90 | 83 | 98 | 93 |
| 20 minutes _____ do | 100 | 98 | 100 | 100 |
| 30 minutes _____ do | | 100 | | |
| Time to reach 90% Completion _____ mins | 10 | 13 | 5 | 8 |

The data shown in Tables 1 and 3 were obtained under equilibrium conditions. When similar metal-containing starting solutions are contacted with these chelate exchange resins in column-type operations, the separation of metal species is considerably enhanced.

In a typical such column operation, a permeable bed of small pieces of the solid chelate exchange resin is provided and flooded with a liquid conditioning solution. The conditioning solution is preferably one which places the amino acid groups of the resin in the desired ion form and adjusts the pH to that of the solution to be treated.

To the column of chelate exchange resin, immersed in such conditioning liquid, is then fed a stream of a starting solution to be treated, which solution contains at least one kind of metal-containing ions capable of interacting with the amino carboxylic acid groups on the chelate exchange resin, displacing the cations originally associated therewith, and forming a chelate complex structure with such amino carboxylic acid groups. When the cations displaced from the amino acid groups are hydrogen ions, it is preferable to provide in the starting solution a system of pH buffer salts, e.g. sodium acetate, to maintain the desired pH value in the solution traversing the chelate resin column.

The starting solution can be fed to the chelate resin column at any desired temperature from just above the freezing or crystallization temperature to just below the boiling point, conveniently at room temperature. With the chelate exchange resins described herein, the rate of flow of solution through the resin bed can be, for example, in the order of from 0.8 to 1 or more gallons of solution per pound of resin (dry basis) per hour, although slower flow rates can, of course, be employed. The flow of solution can be in any direction relative to the bed of resin, i.e. upward, downward, or laterally; usually the flow of solution is downward through the resin bed in order to avoid fluidizing the solid particles of the bed.

During passage of the starting solution through the resin bed, the chelate-forming metal ions in the solution react with the amino acid groups on the resin, displacing the cations therefrom, and forming chelate complexes with such amino acid groups. The flow of solution through the column of resin results in an effluent, the first of which is the conditioning liquid displaced from the bed. This fraction is followed by an effluent derived from the starting solution but substantially free of the chelate-forming metal ions originally contained therein. This part of the effluent contains the solutes of the starting solution that did not react with the amino acid groups of the chelate exchange resin and, in addition, the cations displaced from the resin in exchange for the chelate-forming metal ions from the starting solution. Eventually, the resin becomes satiated with metal chelate, and the chelate-forming metal ions of the starting solution appear in the effluent.

When the starting solution contains only one kind of metal capable of forming a chelate structure with the resin under the instant conditions, the resin is converted substantially to that metal chelate form, and, when the resin is satiated, the composition of the effluent soon becomes substantially the same as that of the starting solution.

When the starting solution contains two or more of such metals capable of forming chelates with the resin under the instant conditions, a different result occurs. In such cases, the resin first removes all of such ions from solution, and the first fractions of effluent are free of such metal ions, as described above. At first then, the resin, e.g. at the feed end of the column, is converted to a form comprising chelate complexes of all of the chelate-forming metals in the contacting solution. As the flow of chelate-forming metal feed solution over such resin continues, a further exchange reaction takes place in which the ion species which forms the most stable chelate complex with the resin, e.g. ion species A, displaces the ion species which forms the least stable chelate complex with the resin under the instant conditions, e.g. ion species B. The displaced ions of species B return to the solution to join other ions of that species and move along the resin bed until again removed from the solution by interaction with amino acid groups and formation of chelate complexes of species B. One consequence of this selective displacement of a less chelate-stable species by a more chelate-stable species is that the metal-laden resin column develops a gradient of composition from the most stable species (A) at the feed end to the least stable species (B) at the outlet end of the resin bed.

Another, and important, consequence of the selective displacement just described concerns the composition of the effluent. When and after the resin column is satiated with chelate metal complexes, continued feeding of starting solution to the column produces an effluent that contains chelate-forming metal ions. At first the effluent contains only the least chelate-stable species (B) and is substantially free of the more stable species (A). Moreover, the concentration of such species B is often greater in such portions of the effluent than in the starting solution, because the displacement into the contacting solution of absorbed species B from the resin by species A augments the concentration of species B already present from the starting solution. In this way, there is obtained an effluent fraction comprising the least chelate-stable ion species B, substantially free of the more chelate-stable ion species A, and in which fraction the concentration of such ion species B is often appreciably greater than in the starting solution.

When the chelate resin becomes satiated with the most stable metal chelate complexes, the effluent contains all of the ion species, and eventually the composition of the effluent is substantially the same as that of the feed. In such circumstances, the metal content of the satiated resin is the same as though a batch of the resin had been placed in a large quantity of the starting solution and had been brought to equilibrium in such solution. The proportion of the most chelate-stable metal species, e.g. species A, in the total metals bound to the chelate resin at equilibrium is always greater than the proportion of that metal ion species among the chelate-forming metals in the starting solution. Where the chelate stability constant of the most chelate-stable metal species, e.g. species A, is very much greater than that of any other ion species in the starting solution, the metal bound in the chelate exchange resin may consist essentially of such species A and be substantially free of other metal species.

The metal-laden resin can be regenerated and the metals bound thereto can be recovered by elution with, for example, an aqueous solution of a strong acid, i.e., a solution of an acid having an ionization constant of at least $10^{-6}$. Usually, the solution remaining in the resin bed at the end of the loading cycle is flushed out, e.g. by means of more of the conditioning solution used prior to feeding the starting solution, and the resin is eluted. A suitable eluent for the metals whose chlorides are soluble in water is hydrochloric acid. Nitric or sulfuric acid can also be used to elute metals whose corresponding salts are soluble in water. The eluent can be fed to the resin bed in the same or different direction relative to the flow of the solution in the loading cycle, and at similar rates and temperatures.

When the resin bed contains more than one species of chelate-bound metal, these can be selectively removed in the eluate, the least chelate-stable (B) coming out first, often in a form substantially free of the others, followed by a mixture of the metal species in which the proportion of the most chelate-stable ion (A) is greater than it had been in the starting solution, and is often greater than it had been in the metal-laden chelate resin.

Thus, the method provides practical means for treating a starting solution that contains at least one kind of chelate-forming metal-containing ions to separate such ions from other ions, including other kinds of chelate-forming metal-containing ions, and to isolate such chelate-forming metal-containing ions from such solutions.

Other means for contacting the starting solution with the chelate-exchange resin can be employed, as hereinbefore set forth. It will be obvious that certain metal-containing effluent fractions obtained in the practice of this method as set forth above can advantageously be employed as feed solutions to further stages of treatment with these kinds of chelate exchange resins.

The following specific examples further illustrate the invention, but are not to be construed as limiting its scope.

EXAMPLE 1

In this example, beads of a water-insoluble chelate exchange resin containing iminodiacetic acid radicals were used. This chelate exchange resin was prepared in the following manner.

A mixture of 20 g. of technical ar-vinylbenzylamine, 2 g. of technical divinylbenzene, and 0.020 g. of azobisisobutyronitrile was dispersed into 50 ml. of a 0.01 percent by weight water solution of methoxycellulose. The technical ar-vinylbenzylamine contained approximately 10 percent by weight of bis(ar-vinylbenzyl)amine, the amines being a mixtures of isomers consisting essentially of approximately 65 percent by weight para-isomer and approximately 35 percent by weight ortho-isomer. The technical divinylbenzene was approximately 55 percent by weight divinylbenzene, 35 percent ethylvinylbenzene, and 10 percent diethylbenzene, these several compounds being mixtures mostly of meta- and para-isomers.

The resulting dispersion was stirred and heated at 80–90° C. for 18 hours, after which there was added thereto 0.040 g. of azobisisobutyronitrile, and heating at 80–90° C. was continued for 4 hours.

The resulting beads of polymeric ar-vinylbenzylamine were collected, washed with water and with acetone, and dried under vacuum.

The beads of polymeric ar-vinylbenzylamine were suspended in an excess of aqueous 10 percent by weight chloroacetic acid solution (containing approximately 5 moles of chloroacetic acid per atom of nitrogen in the polymer), the suspension was heated on a steam bath, and sodium carbonate was added to a pH value of 9. Heating on a steam bath was continued for three days, after which the beads were collected, washed with water, and dried to obtain a resinous product in which was more than 80 percent by weight of polymerized units of N-(ar-vinylbenzyl)iminodiacetic acid. The swelling factor of this resin was 66, as shown hereinbefore.

The resulting chelating resin beads were conditioned by soaking in an aqueous buffer solution of the following composition and having a pH value of 4.5:

0.1 M acetic acid
0.1 M potassium acetate
0.9 M potassium chloride

The so-conditioned beads, immersed in the aqueous buffer solution, were then placed as a bed in a column of the kind conventionally used for ion exchange operations.

To the bed of chelate exchange resin beads was fed an aqueous solution of the following composition:

0.113 M cupric chloride
0.132 M cobalt chloride
0.1 M acetic acid
0.1 M potassium acetate
0.9 M potassium chloride the latter three ingredients constituting a buffer system analogous to the solution in which the resin had been conditioned. The feed solution was passed into the column, and effluent solution was displaced from the column, at an averate rate corresponding to approximately one gallon per pound of resin (dry basis) per hour, the operations being carried out at room temperature. Successive fractions of effluent solution were collected and analyzed. The resulting data are graphically portrayed in Fig. 1 of the drawing, in which the dimension $C/C_0$ is the ratio of the concentration of the test ions in the effluent to the concentration in the feed solution. When the plotted curves merge at $C/C_0=1$, the effluent composition is the same as the feed composition, and the resin is considered to be saturated with respect to the ions of the feed solution under the conditions of the test.

It can be seen from the data in Fig. 1 that the first metal-containing effluent fractions (after displacing the original liquor from the column) contained cobalt ions free of copper ions. It will also be seen that in some of the copper-free effluent fractions, the concentration of cobalt ions was greater than in the feed solution.

During the first portion of the feed and exhaustion cycle just described, the volume of the resin diminished by an estimated 40 percent, due to the contraction of the resin structure by formation of metal chelate linkages, and the bed-volume referred to is the volume of the contracted bed.

After exhaustion of the resin, the remaining metal-containing solution was flushed from the bed with some of the aqueous buffer solution hereinbefore described, and the metal-content of the chelate resin bed was recovered by elution with 6 N hydrochloric acid aqueous solution. The eluate was copper chloride solution substantially free of cobalt. The total amount of copper eluted from the resin as copper chloride corresponded to 3.23 milligram-moles per gram of the dry resin.

EXAMPLE 2

To the resin bed employed in Example 1, after reconditioning the resin in the aqueous buffer solution as described therein, was fed an aqueous solution of the following composition:

0.1 M cupric chloride
0.092 M nickel chloride
0.1 M acetic acid
0.1 M potassium acetate
0.9 M potassium chloride the latter three ingredients being those of the buffer system with which the resin beads had been conditioned. The feed solution was passed into the column at room temperature, and effluent solution was displaced from the column, at an average rate corresponding to approximately one gallon per pound of resin (dry basis) per hour. Successive fractions of effluent solution were collected and analyzed. The resulting data are graphically portrayed in Fig. 2 of the drawing, in which the dimension $C/C_0$ is the ratio of the concentration of the test ions in the effluent to the concentration in the feed solution.

Figure 2:
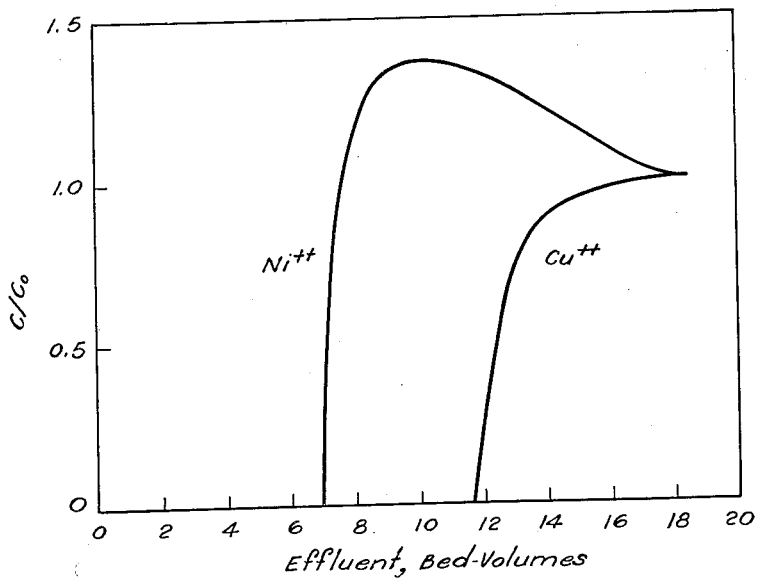

It can be seen from the data in Fig. 2 that the first metal-containing effluent fractions (after displacing the original solution from the column) contained nickel ions free of copper ions. It will also be seen that the concentration of nickel ions in some of the copper-free fractions was greater than in the feed solution.

After exhaustion of the resin, i.e. when the effluent composition was the same as that of the feed solution, the remaining metal-containing solution was flushed from the bed with some of the aqueous buffer solution hereinbefore described, and the metal content of the chelate resin bed was recovered by elution with 6 N hydrochloric acid aqueous solution. The eluate was copper chloride solution substantially free of nickel.

EXAMPLE 3

In this example, beads of a water-insoluble polymeric N-(ar-vinylbenzyl)aspartic acid resin were used. This chelate exchange resin was prepared in the following manner.

In a reaction vessel were mixed 48 g. of technical ar-vinylbenzylamine and 90 g. of diethyl maleate in 60 ml. of ethanol. The ar-vinylbenzylamine was a mixture of isomers consisting essentially of approximately 60 percent by weight of p-vinylbenzylamine and approximately 40 percent by weight of o-vinylbenzylamine. The resulting reaction mixture was kept at room temperature for three days under an atmosphere of nitrogen. The resulting solution was diluted with four volumes of water, acidified to pH of 2 with concentrated hydrochloric acid, and extracted with approximately 45 ml. of chloroform. The water layer was made alkaline by addition of sodium hydroxide to pH 10 and was extracted with chloroform. The latter chloroform extract was condensed by vaporization of chloroform under vacuum, leaving approximately 90 g. of residue consisting essentially of diethyl N-(ar-vinylbenyl) aspartate.

A mixture of 85 g. of diethyl N-(ar-vinylbenzyl) aspartate (prepared in the manner just described), 4.5 g. of technical divinylbenzene (containing approximately 55 percent by weight divinylbenzene, 35 percent ethylvinylbenzene, and 10 percent diethylbenzene, these being mixed isomers, predominately meta- and para-isomers), 0.9 g. of sodium ar-vinylbenzenesulfonic acid, 0.9 g. of azobisisobutyronitrile and 400 ml. of water is stirred and heated to 40°–50° C. After addition of 100 ml. of 1 percent by weight aluminum sulfate aqueous solution, the resulting dispersion is heated to 100° C. and vigorously stirred for three hours, after which the mixture is heated without stirring for 18 hours on steam. The polymer beads are collected, and washed with water and with acetone and again with water.

Beads of resinous polymer so obtained are then suspended in 15 percent by weight sulfuric acid and heated at reflux for 18 hours to hydrolyze the ester groups. After washing with water the resin beads, having diameters in range from approximately 0.01 inch to approximately 0.03 inch, are ready for use as described below. These resin beads had a swelling factor of 53 as shown hereinbefore.

The resulting resin beads were conditioned by soaking in an aqueous solution having the following composition:

1 N potassium chloride
5 N ammonium hydroxide

The conditioned resin beads were placed as a bed in a column of the kind conventionally used in ion exchange operations, and the bed was flooded with the afore-mentioned ammoniacal solution.

To the bed of chelate exchange resin beads was fed an equeous solution which was one molar in potassium chloride, five molar in ammonium hydroxide, and 0.01 molar in each of the metals copper, cobalt, and nickel originally added as cupric chloride, cobaltous chloride and nickelous chloride, the metal ions being in the ammine complex form in the ammonium hydroxide solution. The feed solution was fed into the column at room temperature and at a rate corresponding to approximately 0.8 gallon per pound of dry resin per hour. Fractions of effluent were taken and analyzed. The first metal-containing effluent fractions contained cobalt substantially free of copper and nickel until approximately 23 bed-volumes of effluent had been collected. At this point, copper appeared in the effluent. As the feed continued, the concentration of copper in the instantaneous effluent rose rapidly to a value more than twice that in the feed solution and thereafter decreased to the same value as that in the feed solution. After approximately 31 bed-volumes of total effluent nickel appeared in the effluent, and after approximately 50 bed-volumes of effluent had been collected the instantaneous effluent composition was substantially the same as that of the feed.

EXAMPLE 4

The same chelate exchange resin bed used in Example 3 was conditioned by soaking in an aqueous buffer solution having the following composition and having a pH value of 4.5:

1.1 M potassium chloride
0.1 M acetic acid
0.1 M potassium acetate

To the bed, initially flooded with the above buffer solution, was fed an aqueous solution containing the same kinds and concentrations of ingredients as the buffer solution and, in addition thereto, cupric and cobaltous ions originally as chlorides, each in 0.1 Molar concentration. The solution was fed at room temperature at an average rate corresponding to approximately 0.8 gallon per pound of resin (dry basis) per hour, and fractions of the effluent were collected and analyzed. Cobalt ions appeared in the effluent after approximately 3.5 bed-volumes of solution had passed out of the bed. The first metal-containing effluent fractions were free of copper, and the concentration of cobalt in the instanteous effluent rose rapidly to a value of more than 0.125 M and thereafter diminished toward the feed concentration. Approximately 5 bed-volumes of effluent containing cobalt and free of copper were collected before copper ions appeared in the effluent. The operation was terminated before the instantaneous composition of the effluent was quite identical with that of the feed, and the bed was flushed with the afore-mentioned aqueous buffer solution.

The metal-laden chelate resin bed was then eluted by passing therethrough an aqueous solution which was 0.1 Normal in respect to hydrochloric acid and 1.0 Normal in respect to potassium chloride. The eluate contained cupric chloride in amount corresponding to approximately 0.25 pound of copper per pound of chelate resin (dry basis) and was substantially free of cobalt.

EXAMPLE 5

In this example, granules of a water-insoluble resin comprising copolymeric 2-(p-vinylphenyl)glycine crosslinked with N,N-bis(ar-vinylbenzyl)glycine were used. This chelate exchange resin is prepared in the following manner.

A solution of 10 parts by weight of 2-(p-vinylphenyl)glycine, 0.5 part by weight of N,N-bis(ar-vinylbenzyl)glycine, 100 parts by weight of 1 N sodium hydroxide solution, and 0.05 part by weight of sodium persulfate is heated to reflux. The 2-(p-vinylphenyl)glycine is obtained from p-vinylbenzaldehyde by the Strecker reaction. The N,N-bis-(ar-vinylbenzyl)glycine is obtained by reaction of ar-vinylbenzyl chloride (60 percent p-, 40 percent o-isomer) with glycine in an alkaline aqueous reaction mixture. From time to time, further amounts of catalyst (sodium persulfate and/or azobisisobutyronitrile) are added to the refluxing mixture until the monomers are substantially polymerized. The mixture is then cooled and acidified to pH value of 5 with hydrochloric acid. The precipitated resin solid is collected, washed, dried, and ground to fine granules which are suitable for use in the manner described below. The swelling factor, as hereinbefore defined, for this resin product is more than 50.

The resulting resin granules were conditioned by soaking in an aqueous salt brine containing 4.8 M sodium chloride and sodium hydroxide to a pH value of 10. The resin granules were placed as a bed in a conventional ion exchange operation column and flooded with the alkaline salt brine.

To the bed of chelate exchange resin granules was fed an aqueous solution having the following composition:

4.8 M sodium chloride
0.022 M calcium chloride
15 p.p.m. (parts per million, by weight) mercury, probably as $Na_2HgCl_4$ the solution having been made alkaline to pH 10 by addition of a small amount of sodium hydroxide. The feed solution was fed to the column at room temperature and at an average rate corresponding to approximately one gallon per pound of resin (dry basis) per hour. The effluent solution comprised sodium chloride and calcium chloride in concentrations the same as those of the feed solution, but the concentration of mercury was much reduced. After passing 800 bed-volumes of solution through the column, the instantaneous effluent contained less than one part per million of mercury, and after 2400 bed-volumes the concentration of mercury in the effluent was only 1.8 parts per million. It was the opinion of the operator that channeling was taking place in this test, i.e. that part of the feed solution was traversing the column without intimately contacting the resin bed, and that an effluent free of mercury could have been obtained by mechanical improvement in the apparatus to prevent such channeling.

The foregoing operations were stopped before the resin bed was saturated with mercury, and the bed was flushed with the alkaline brine mentioned above. The chelate resin bed was then eluted with an aqueous solution that was one Normal with respect to hydrochloric acid and 5 Molar with respect to sodium chloride, whereby mercury was removed from the chelate and recovered in the eluate.

EXAMPLE 6

Figure 3:
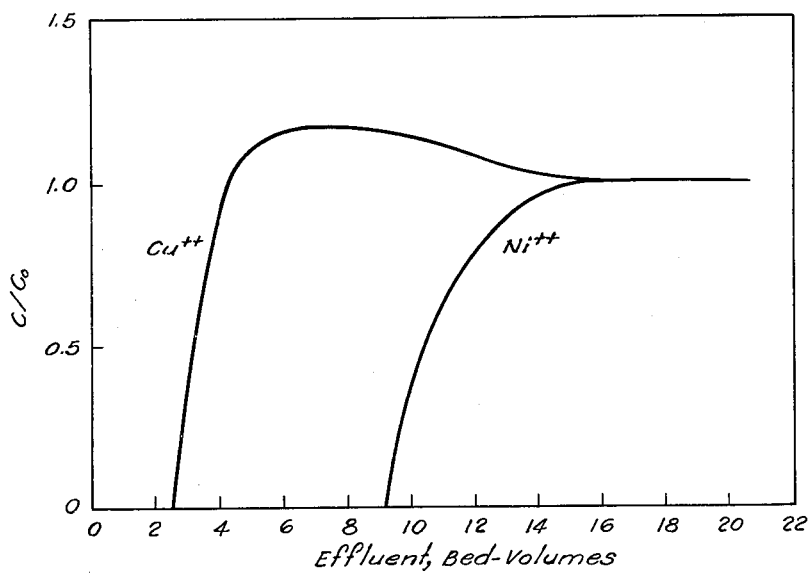

In this example, the chelate exchange resin material was in the form of small beads (0.01- to 0.03-inch diameters) and was a water-insoluble copolymer of N-(ar-vinylbenzyl)-iminodiacetic acid and approximately 2 percent by weight of divinylbenzene as crosslinking agent (cf. the resin of Example 1). The resin beads were placed as a bed in a conventional ion exchange column and were conditioned by soaking in a 3.8 M ammonium hydroxide aqueous solution. To the bed of resin so conditioned was fed an aqueous solution having the following composition:

0.39 M $CuSO_4$
0.050 M $NiCl_2$
3.8 M $NH_4OH$ the metal compounds being those in the form of which the metals were originally supplied to the solution; in the ammoniacal solution, the copper and nickel ions probably existed in the form of ammine complex ions. The feed solution was fed at an average rate corresponding approximately to one gallon per pound of resin (dry basis) per hour, and the operation was carried out at room temperature. Fractions of the effluent were collected and analyzed to obtain the data shown in Fig. 3 of the drawing. It will be seen that approximately 7 bed-volumes of effluent containing copper were taken before any nickel appeared, and that the concentration of copper in most of this nickel-free effluent was greater than in the starting solution. When the composition of the effluent was the same as the feed, the resin bed was considered to be saturated, and the feed of starting solution was stopped.

The bed was flushed with 1 M ammonium hydroxide-1 M ammonium chloride solution, and the metal-laden resin was then eluted with 0.5 M hydrochloric acid solution. Fractions of the effluent during elution were taken and analyzed to obtain the data shown in Fig. 4 of the drawing.

Figure 4:
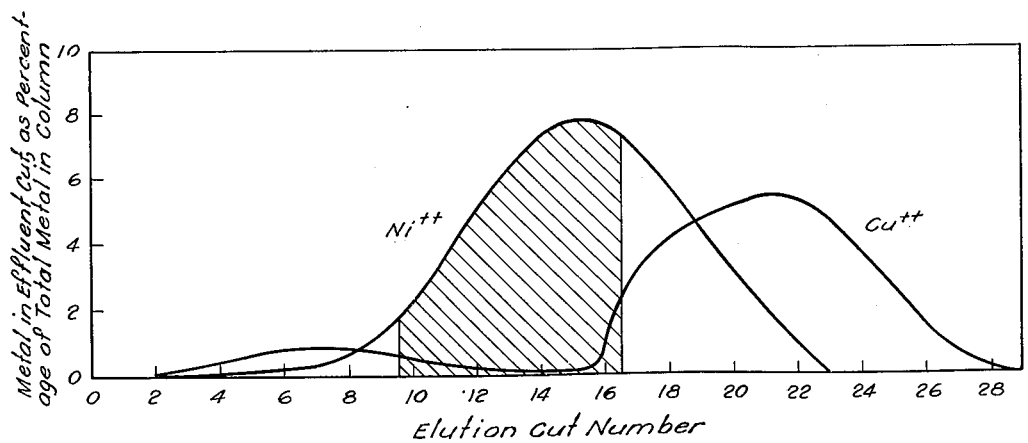

It will be seen from the data in Fig. 4 that the metals were selectively eluted. The first fractions of effluent during elution were ammoniacal, the copper being preferentially eluted. The alkalinity in the effluent persisted to about fraction No. 11. From about fraction No. 10 through fraction 16, the effluent contained a large concentration of nickel and very little copper, the nickel being preferentially eluted. After fraction 16, the effluent container copper until both nickel and copper were completely eluted from the column. In combined fractions 10–16 (the shaded area on Fig. 4) approximately 64 percent of the total amount of nickel on the resin was eluted at a molar purity of 96.5 percent. The total amounts of metals eluted from the bed corresponded to 0.058 pound of copper and 0.09 pound of nickel per pound of resin (dry basis).

That which is claimed is:

1. A method which comprises contacting an aqueous liquid solution of an ionizable metal compound with a solid chelate exchange resin insoluble but swellable therein, the resin being one whose molecular structure is an addition polymer of an ar-vinylphenyl aliphatic aminocarboxylic acid having the monomeric formula

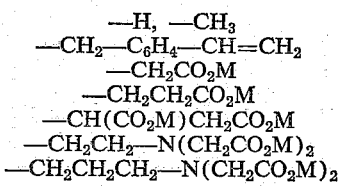

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$
—$CH_2$—$C_6H_4$—CH=$CH_2$
—$CH_2CO_2M$
—$CH_2CH_2CO_2M$
—CH($CO_2M$)$CH_2CO_2M$
—$CH_2CH_2$—N($CH_2CO_2M$)$_2$
—$CH_2CH_2CH_2$—N($CH_2CO_2M$)$_2$ and

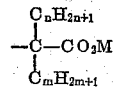

where $n$ is an integer from 1 to 4, $m$ is an integer from 0 to 2, and M is a cation, and wherein at least one of the radicals represented by the symbols $R_1$, $R_3$, and $R_4$ contains a —$CO_2M$ group which together with the nitrogen atom constitutes a metal-chelating group, the resin being further characterized as having a swelling factor of at least 30, the swelling factor being defined as the arithmetic product in the equation $$SF = (GWC) \times (V'/V)$$

wherein the symbol (GWC) represents the gel water content of the resin at its isoelectric pH in percent by weight of water in the resin saturated with water at room temperature, and wherein the symbol ($V'/V$) represents the ratio of the volume of the resin saturated with water at a pH value of 10 to the volume of the resin saturated with water at the isoelectric pH of the resin, the contacting aqueous liquid solution being one that contains at least one kind of metal-containing ion that is capable of displacing the cation M from the metal-chelating groups of the resin and forming therewith a chelate structure.

2. The method according to claim 1 wherein the solid chelate exchange resin is one whose molecular structure is an addition polymer of an ar-vinylphenyl aliphatic aminocarboxylic acid having the monomeric formula

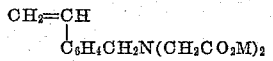

3. The method according to claim 1 wherein the solid chelate exchange resin is one whose molecular structure is an addition polymer of an ar-vinylphenyl aliphatic aminocarboxylic acid having the monomeric formula

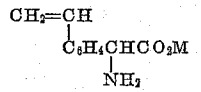

4. The method according to claim 1 wherein the solid chelate exchange resin is one whose molecular structure is an addition polymer of an ar-vinylphenyl aliphatic aminocarboxylic acid having the monomeric formula

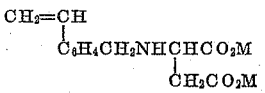

5. The method according to claim 1 wherein the contacting aqueous liquid solution contains ions of at least two kinds of metals that are capable of displacing the cation M from the metal-chelating groups of the resin and forming a chelate structure with such groups, one of which kinds of metals has a greater affinity for the chelating groups of the resin than do other kinds of metals in the aqueous solution.

6. A method which comprises feeding a starting aqueous liquid solution of an ionizable metal compound to a water-immersed bed of a granular, water-insoluble but water-swellable, solid chelate exchange resin whose molecular structure is an addition polymer of an ar-vinylphenyl aliphatic aminocarboxylic acid having the monomeric formula

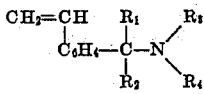

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$
—$CH_2$—$C_6H_4$—CH=$CH_2$
—$CH_2CO_2M$
—$CH_2CH_2CO_2M$
—CH($CO_2M$)$CH_2CO_2M$
—$CH_2CH_2$—N($CH_2CO_2M$)$_2$
—$CH_2CH_2CH_2$—N($CH_2CO_2M$)$_2$ and

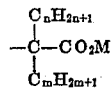

where $n$ is an integer from 1 to 4, $m$ is an integer from 0 to 2, and M is a cation, and wherein at least one of the radicals represented by the symbols $R_1$, $R_3$, and $R_4$ contains a —$CO_2M$ group which together with the nitrogen atom constitutes a metal-chelating group, the resin being further characterized as having a swelling factor of at least 30, the swelling factor being defined as the arithmetic product in the equation $$SF = (GWC) \times (V'/V)$$

wherein the symbol (GWC) represents the gel water content of the resin at its isoelectric pH in percent by weight of water in the resin saturated with water at room temperature, and wherein the symbol ($V'/V$) represents the ratio of the volume of the resin saturated with water at a pH value of 10 to the volume of the resin saturated with water at the isoelectric pH of the resin, the contacting aqueous liquid solution being one that contains ions of at least two kinds of metals, one of which kinds of metals has a greater affinity than any other in the starting solution for the metal-chelating groups of the resin and is capable of displacing cation M therefrom and forming a chelate structure with such groups, thereby displacing water from the bed and obtaining an effluent liquid fraction which is substantially free of ions of that kind of metal in the starting solution that has the greatest affinity for the metal-chelating groups of the resin.

7. The method according to claim 6 wherein the starting solution contains ions of at least two kinds of metals capable of displacing the cation M from the metal-chelating groups of the resin and forming a chelate structure with such groups.

8. The method according to claim 7 wherein the feeding of the starting solution is continued until the chelate exchange resin contains chelate-bound metals in which the proportion of that kind of metal having the greatest affinity for the metal-chelating groups of the resin is greater than the proportion of that kind of metal in the metal-containing ions of the starting solution.

9. The method according to claim 8 wherein the solid chelate exchange resin is one whose molecular structure is an addition polymer of an ar-vinylphenyl aliphatic aminocarboxylic acid having the monomeric formula

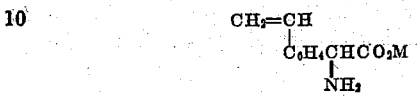

10. The method according to claim 8 wherein the solid chelate exchange resin is one whose molecular structure is an addition polymer of an ar-vinylphenyl aliphatic aminocarboxylic acid having the monomeric formula

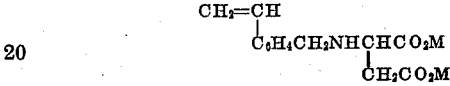

11. The method according to claim 8 wherein the solid chelate exchange resin is one whose molecular structure is an addition polymer of an ar-vinylphenyl aliphatic aminocarboxylic acid having the monomeric formula

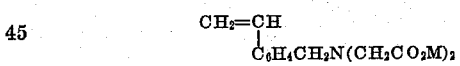

12. A method according to claim 6 wherein the starting aqueous solution contains ions of at least two kinds of metals that are capable of displacing cation M from the metal-chelating groups of the resin and forming therewith a chelate structure, one of which kinds of metals, identified as type A, has a greater affinity for the chelating groups than do other such kinds of metals, and one of which kinds of metals, identified as type B, has a lessor affinity for the chelating groups than do other such kinds of metals, the flow of the starting solution through the resin bed being continued to produce a series of effluent fractions comprising a fraction that contains ions of metal B and is substantially free of ions of metal A.

13. A metal according to claim 12 wherein the flow of starting solution is continued until the instantaneous effluent has substantially the same composition as the starting solution and the chelate exchange resin is satiated with chelate-forming metal.

14. The method according to claim 12 wherein the solid chelate exchange resin is one whose molecular structure is an addition polymer of an ar-vinylphenyl aliphatic aminocarboxylic acid having the monomeric formula

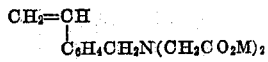

15. The method according to claim 12 wherein the solid chelate exchange resin is one whose molecular structure is an addition polymer of an ar-vinylphenyl aliphatic aminocarboxylic acid having the monomeric formula

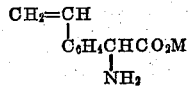

16. The method according to claim 12 wherein the solid chelate exchange resin is one whose molecular structure is an addition polymer of an ar-vinylphenyl aliphatic aminocarboxylic acid having the monomeric formula

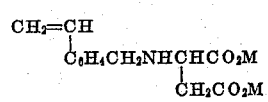

17. A method according to claim 1 which comprises the further step of eluting the metal from the chelate exchange resin by contacting the same with an aqueous solution of a strong acid.

18. A method according to claim 7 which comprises the further steps of feeding to the resulting metal-laden chelate exchange resin a liquid aqueous eluting agent comprising a strong acid capable of dissociating the chelate structures of the resin and solubilizing the metal constituents thereof, thereby obtaining as eluate fractions a series of metal-containing aqueous liquid solutions.

19. A method according to claim 18 wherein the metals bound in the metal-laden chelate exchange resin are of at least two kinds, one of which, identified as metal A, forms the most stable chelate with the chelating group of the resin, and one of which kinds of metals, identified as metal B, forms the least stable chelate with the chelating groups of the resin, whereby there are obtained in the eluate fractions a fraction that contains ions of metal B and is substantially free of ions of metal A, and a fraction that contains ions of metal A in a proportion to the total metals in such fraction that is greater than such proportion in the metal-laden chelate exchange resin subjected to such elution.

References Cited in the file of this patent

UNITED STATES PATENTS 2,875,162    Morris _____ Feb. 24, 1959

OTHER REFERENCES

Gregor et al.: Ind. and Eng. Chem., vol. 44, pages 2834–2839, December 1952.

Hale: Research, vol. 9, pages 104–108, 1956.